US006069462A

United States Patent [19]

Flynn

[11] Patent Number: 6,069,462

[45] Date of Patent: May 30, 2000

[54] REMOTE CONTROL ANTENNA ROTOR SYSTEM

[76] Inventor: Eamonn Flynn, R. R. #1, Rockwood, Ontario, Canada, N0B 2K0

[21] Appl. No.: 08/076,160

[22] Filed: Jun. 14, 1993

Related U.S. Application Data

[63] Continuation of application No. 07/853,579, Mar. 18, 1992, abandoned.

[51] Int. Cl.[7] .............................. G05B 23/02; H04B 7/08; H02P 1/04

[52] U.S. Cl. .......................... 318/565; 318/466; 318/602; 318/567; 455/151.4

[58] Field of Search .................................... 318/560–646, 318/664, 289, 466, 663, 16, 673, 470, 672, 675; 340/522, 539, 825.69, 825.76; 358/86, 142, 181, 93, 84, 83, 183, 188; 455/151–153, 352, 158; 343/7.4, 766, 763, 757; 342/357

[56] References Cited

U.S. PATENT DOCUMENTS

| | | | |
|---|---|---|---|
| 3,860,859 | 1/1975 | Buckley | 318/265 |
| 3,896,445 | 7/1975 | Atkinson | 343/117 |
| 4,072,886 | 2/1978 | Dammeyer | 318/602 |
| 4,131,839 | 12/1978 | Springer | 318/675 |
| 4,318,106 | 3/1982 | Luedtke | 343/124 |
| 4,352,202 | 9/1982 | Carney | 455/151 |
| 4,496,890 | 1/1985 | Wurdack et al. | 318/600 |
| 4,542,326 | 9/1985 | Hornback | 318/565 |
| 4,803,412 | 2/1989 | Burton | 318/567 |
| 4,804,899 | 2/1989 | Wurdack et al. | 318/600 |

*Primary Examiner*—Paul Ip

[57] ABSTRACT

A control unit for a rotary T.V. antenna which is responsive to a signal representative of a selected T.V. channel to produce a power output adapted to rotate the antenna to a predetermined appropriate position for receiving the selected T.V. channel such control unit can be responsive to the signal from a remote control T.V. channel selector.

6 Claims, 3 Drawing Sheets

REMOTE CONTROL ANTENNA ROTOR SYSTEM

This is a Continuation application of application Ser. No. 07,853,579 filed on Mar. 18, 1992, now abandoned.

FIELD OF THE INVENTION

This invention relates to a remote control antenna rotor system for a television receiver.

BACKGROUND OF THE INVENTION

In television receivers having rotary antennas, in order to obtain the optimum picture reception for each selected channel it is necessary to adjust the rotational position of the antenna to the appopriate position for such channel. To accomplish this rotation the antenna is normally driven by a reversible motor. Conventionnally, antenna rotation is controlled by a manually controlled switch arrangement and when the T.V. channel is changed the operator then manually controls the antenna motor usually from a position adjacent to the T.V. receiver to adjust the antenna to hunt for the optimum picture by watching the picture as the antenna's rotational position is adjusted.

To overcome the adverse de-tuning effects of standing near the T.V. set, U.S. Pat. No. 3,886,559, issued May 27, 1975, discloses a hard wired manually controlled remote control for the antenna motor so that the operator after selection of the T.V. channel does not have to stand adjacent to the T.V. when adjusting the antenna to bring in the optimum signal from such channel. A further U.S. Pat. No. 3,508,274, issued Apr. 21, 1970, discloses an antenna for, inter alia, T.V. receivers employing a reversible motor arrangement which can be remotely controlled by manually controlled radio or acoustic signals to rotate the antenna so that the operator can hunt for and bring in the optimum signal for the channel selected.

SUMMARY OF THE INVENTION

The present invention provides a significant improvement over such previous arrangements by providing a control unit for the motor of a rotary T.V. antenna which is actuated by a signal representative of a selected channel to thereafter automatically effect antenna rotation to the appropriate predetermined position for receiving such selected channel.

According to the preferred form of the invention the antenna control unit is actuated by the signal from a remote control T.V. channel selector so that changing of the T.V. channel simulataneously effects rotation of the antenna to the appropriate predetermined position for reception of each channel selected.

BRIEF DESCRIPTION OF THE DRAWINGS

The invention will be more fully understood from the following detailed description in which.

DETAILED DESCRIPTION ACCORDING TO THE PREFERRED EMBODIMENTS OF THE PRESENT INVENTION

Figure 1:
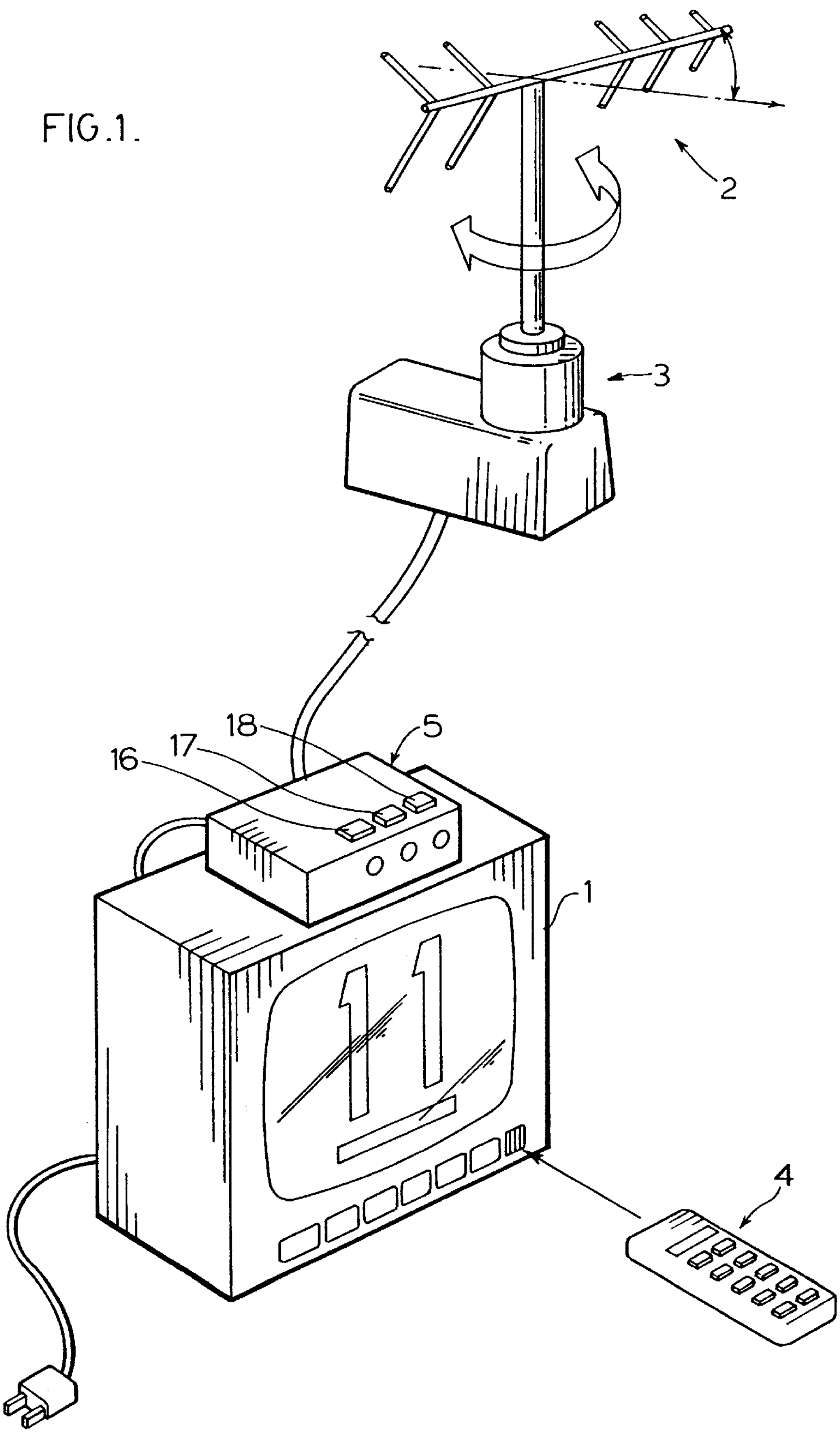
FIG. 1 is a perspective view illustrating a T.V. having a rotary antenna system connected to a control unit in accordance with the invention for operation by the remote control channel selector for the T.V.

With reference to FIG. 1, the television receiver or T.V. 1 is connected to receive signals from a rotary antenna 2 driven by a reversible motor 3. A T.V. remote control channel selector 4, which generates an infrared signal, controls the selection of the channel on the T.V. set in the conventional manner to produce a signal representative of the desired selected channel, that is, a channel selecting signal to produce in the T.V. a local oscillation frequency to heterodyne with the incoming channel frequency to produce the desired intermediate frequency for processing by the television receiver to generate the selected channel picture.

It will be understood that as opposed to cable reception, the antenna is required to be rotated to different positions to receive the different channel signals arriving from different directions. Conventionally, after the channel is changed by remote control 4, the controls of the rotary antenna motor are manually manipulated while watching the T.V. picture to rotate or orient the antenna to the appropriate position to obtain optimum picture reception.

In the present invention control of the antenna to the appropriate position for the selected channel is achieved by a control unit 5 adapted to respond to the infrared signal from the remote control unit 4 for the T.V. to effect antenna rotation to a predetermined appropriate position for reception of the signal from the selected channel.

Figure 2:
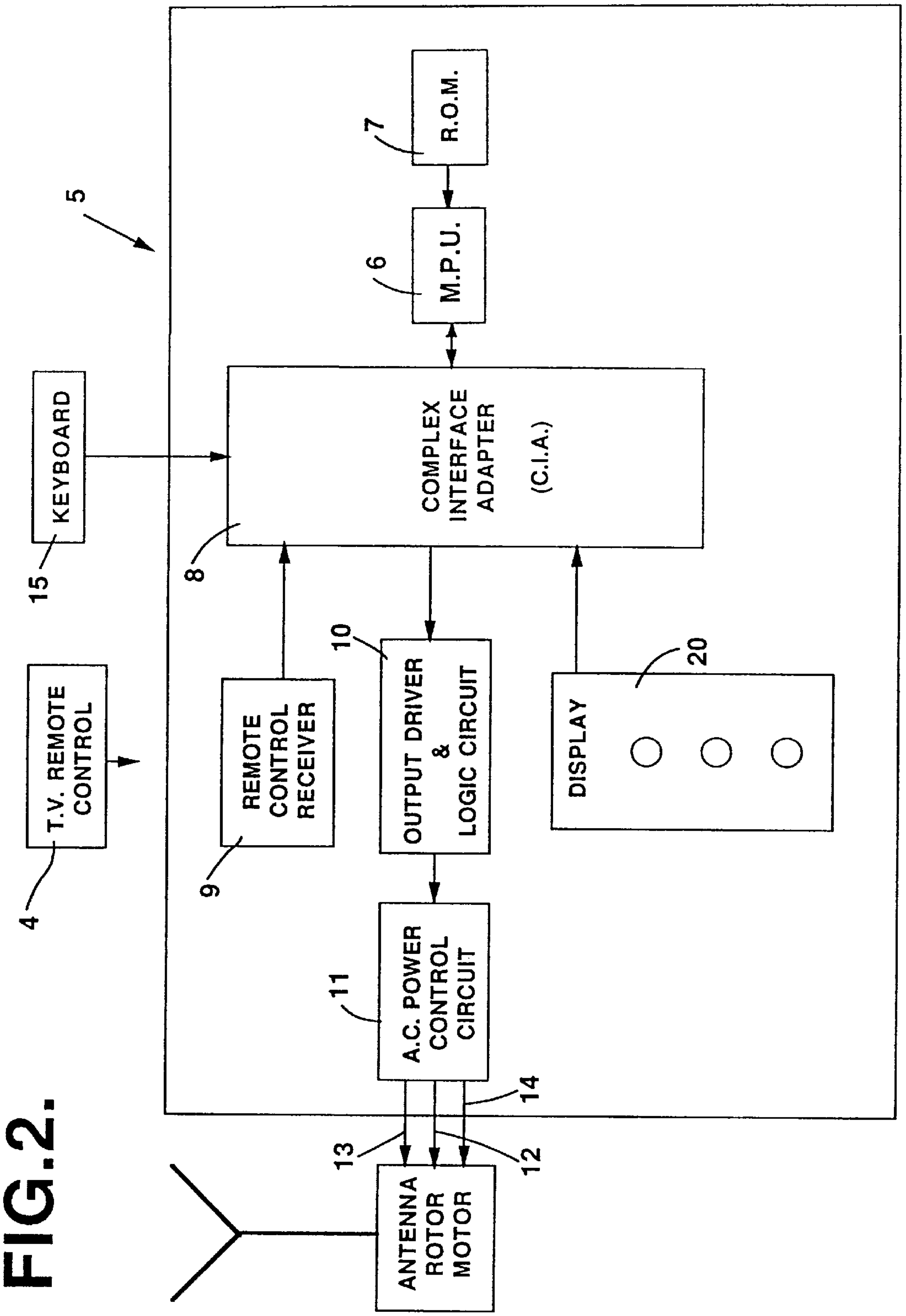
FIG. 2 is a block diagram illustrating the various components of the antenna control unit.

With reference to FIG. 2 the rotary antenna control unit 5 comprises a micro processor unit 6 having a random access memory (RAM) for storing in an information array or look-up table digital information representing the various antenna positions for optimum reception of the various channels to be selected by the T.V. remote control 4 and digital information representing the various corresponding infrared signals for selecting such channels produced by the remote control 4.

The micro processor unit 6 connects with a ROM (Read Only Memory) 7 which is programmed when accessed by the M.P.U. to provide digital signals comprising instructions as computed by the micro processor 6 for actuation of the antenna rotor motor 3.

Connected to the micro processor unit 6 through a complex interface adapter (C.I.A.) 8 is an infrared receiver 9 which is adapted to receive the signals from the T.V. remote control 4 and transfer same through the C.I.A. to the M.P.U. to access the random access memory of the M.P.U. to look up the antenna position for the channel selected by the T.V. remote control 4.

The M.P.U. in turn, on computing any positional difference between the stored appropriate antenna position for such selected channel and the actual antenna position is adapted to access the ROM 7 to produce an output signal through the C.I.A. to an output driver and logic circuit 10. The circuit 10 in turn controls an A.C. power control circuit 11 to provide power through common line 12 and one of the left (counterclockwise) or right (clockwise) motor control lines,13 and 14. The length of time and the direction for which the power is supplied is dependent upon the displacement of the actual position of the antenna at the time the channel is selected from the appropriate antenna position for such selected channel as stored in the M.P.U. look-up table. This time and direction is calculated by the M.P.U. which accesses the ROM accordingly to produce the required antenna movement. The output driver and logic circuit 10 converts the digital information fed thereto from the M.P.U. through the C.I.A. to energize the AC power control unit 11 to power the appropriate left or right motor control 13 or 14 to effect the actual rotation of antenna to the appropriate position for the channel selected.

To program the M.P.U. 6 with the information array or look-up table relating the appropriate antenna positions for the various channels to be selected and the corresponding signals from the T.V. remote control selector representing such channels for effecting selection of such channels a keyboard 15 is provided.

Figure 3:
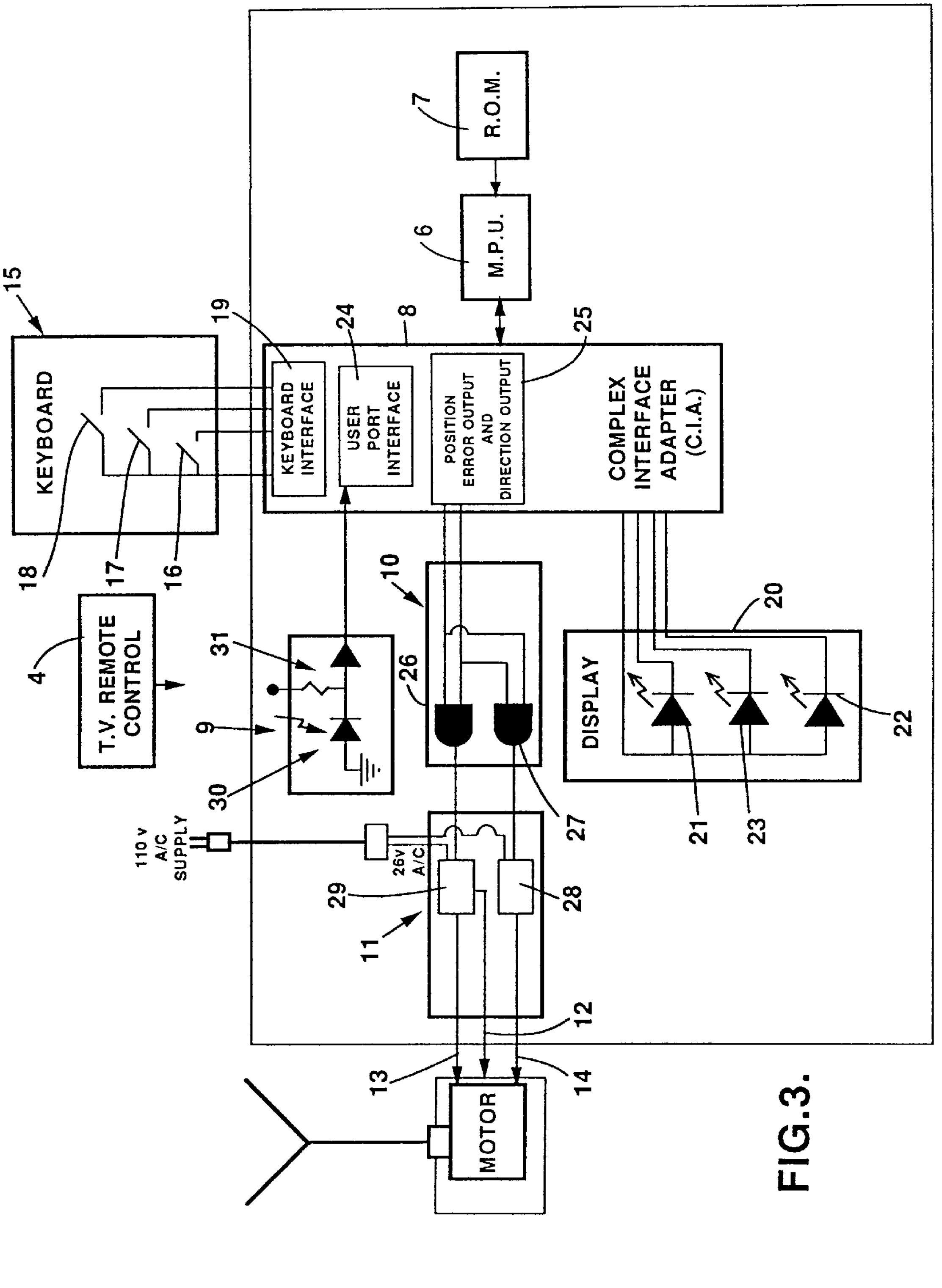
FIG. 3 is a partial schematic partial block diagram of the control unit of FIG. 2.

As shown in FIGS. 1 and 3, the keyboard has three keys or buttons 16, 17 and 18. Button 16 is connected through a keyboard interface 19 (FIG. 3) to control the right hand or clockwise motor control through the line 14. Keyboard button 17 is to control the left hand or counterclockwise motor control through line 13.

In programming the M.P.U. 8, the T.V. remote control is first energized to select a channel. Then keyboard buttons 14 and 15 are manuipulated as requred to access the R.O.M. associated with the M.P.U. through the C.I.A. as long as they are depressed to produce digital output signals which are outputted through the C.I.A. to the output driver and logic circuit 10 and A.C. power control circuit 11 to rotate the antenna to the appropriate position to give optimum picture reception for the selected channel. Keyboard button 18 is then actuated to prepare for entry of the signal of the selected channel into storage in said M.P.U. in association with the appropriate antenna position for such selected channel. The T.V. remote control is then again actuated to produce the signal representative of the selected channel to effect its entry into storage.

Connected to the C.I.A. is a display pannel 20 having an LED "power on" light 21, an LED "antenna in motion light" 22 and an LED light 23 which is energized when "enter value button" 18 of the keyboard is actuated. While the enter value light 23 is on, the channel selector is again actuated for the same channel for which the appropriate antenna position has been determined and this signal received by the infrared receiver 9 is entered through user port interface 24 (FIG. 3) incorporated in the C.I.A. into storage as digital information in association with the digital information representing the appropriate antenna position for such channel. WHen such channel selector signal information has been stored, the enter value light 4 is extinguished. This procedure is repeated for each of the channels of the channel selector. Thereafter, when the T.V. remote control 4 is actuated to select one of the channels whose signal has been stored in association with the appropriate antenna position information, the receiver will access the M.P.U. through the C.I.A. user port interface 24, for calculation of the movement required to move the antenna from its actual position at that time to the appropriate position. Thereupon the M.P.U. accesses the programmed ROM to produce the requisite output signal through a position error and direction output C.I.A. interface 25 (FIG. 3) to the output driver and logic circuit 10 and the AC power control circuit 11 to actuate the antenna to the appropriate position.

As illustrated in FIG. 3, the output driver and logic circuit 10 has a pair of antenna control logic gates 26 and 27 to convert instructions from the position error output and direction output interface 25 to power the right, clockwise, or left, counterclockwise, motor controls 28 and 29 respectively. Also as shown in FIG. 3, the infrared receiver 9 employs the usual photodiode 30 and signal conditioner 31 which outputs to the user port interface 24.

It will be understood that the control unit 5 can be conveniently set on top of the T.V. and when the user selects a channel using the T.V. remote control 4 the control unit 5 will at the same time also in response to the channel selector signal automatically effect antenna rotation to the appropriate predetermined position for optimum picture reception.

It will be understood that variations in circuit and programming arrangements may be made without departing from the spirit of the invention or scope of the appended claims.

What is claimed is:

1. A control unit for controlling a rotary motor driven antenna for use with a T.V. in which the channels of the T.V. are selected by signals transmitted by a wireless remote control channel selector, said control unit having a microprocessor, said microprocessor having a programmable random access memory to store in associated relation information representing the appropriate desired antenna position for each desired T.V. channel to be selected by each signal transmitted by the remote control channel selector and information representing the transmitted signal for which the desired antenna position has been stored, said control unit having a receiver to detect the said transmitted channel selector signals, said receiver being connected through said microprocessor to access from said random access memory the information for the appropriate desired antenna position for the T.V. channel selected by the channel selector signal detected, a power output circuit for connection to the antenna motor for rotating the antenna, a read only memory connected to said microprocessor and programmed to provide instruction to said output circuit under control of said microprocessor to effect antenna rotation in an amount as computed by said microprocessor to rotate the antenna from an existing position to the appropriate position for the channel selected as detected by said control unit receiver and accessed from said random access memory.

2. A control unit as claimed in claim 1 in which means are provided to input through said microprocessor into storage in said random access memory in associated relation information representing the appropriate respective antenna positions for the respective T.V. channels selected by the respective channel selector signals transmitted by the remote control channel selector and information representing the respective channel selector signals for said selected T.V. channels as detected by said control unit receiver.

3. A control unit as claimed in claim 2 in which said means to provide input into storage is a keyboard.

4. A control unit for controlling a rotary motor driven antenna for use with a T.V. in which the channels of the T.V. are selected by signals transmitted by a wireless remote control channel selector, said control unit having a power output control circuit for connection to the antenna motor, a receiver to detect the said channel selecting signals transmitted by the T.V. remote control channel selector and produce signals representative respectively of the selected T.V. channels, a microprocessor in connection with said receiver to be addressed by said signals representative respectively of the selected T.V. channels, said microprocessor having a programmable random access memory to store in associated relation information representative of the signal produced by said control unit receiver for each T.V. channel to be selected and information representing the corresponding desired antenna position for each such T.V. channel, means for inputting said associated information into said random access memory, a read only memory connected to said microprocessor and programmed to provide instructions to said output power circuit under control of said microprocessor when said microprocessor is addressed by signals representative of the selected T.V. channels produced by said receiver on detecting signals transmitted by the channel selector to effect antenna rotation in an amount to rotate the antenna from an existing position to the desired position for the channel selected as detected by said control unit receiver.

5. A control unit is claimed in claim 4 in which said means for inputting said associated information into said random access memory is a keyboard.

6. A control unit as claimed in claim 5 for use with a channel selector transmitting infrared channel selecting signals in which said control unit receiver is an infrared receiver.

* * * * *